US007681834B2

(12) United States Patent
Facciano et al.

(10) Patent No.: US 7,681,834 B2

(45) Date of Patent: Mar. 23, 2010

(54) COMPOSITE MISSILE NOSE CONE

(75) Inventors: Andrew B. Facciano, Tucson, AZ (US); Robert T. Moore, Tucson, AZ (US); Gregg J. Hlavacek, Tucson, AZ (US); Craig D. Seasly, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 195 days.

(21) Appl. No.: 11/395,794

(22) Filed: Mar. 31, 2006

(65) Prior Publication Data

US 2007/0228211 A1 Oct. 4, 2007

(51) Int. Cl.
*B64C 1/00* (2006.01)

(52) U.S. Cl. ........................ 244/119; 244/120; 244/121

(58) Field of Classification Search ................ 244/119, 244/120, 121, 173.1; 343/705, 708, 878, 343/895, 872, 713; 102/293, 377
See application file for complete search history.

(56) References Cited

U.S. PATENT DOCUMENTS 2,510,110 A * 6/1950 Hickman .................... 102/374
3,063,654 A * 11/1962 Youngren et al. ........... 343/872
3,128,466 A * 4/1964 Brown et al. ................ 343/705
3,314,070 A * 4/1967 Youngren ................... 343/708
3,509,571 A * 4/1970 Jones, Jr. et al. ............ 343/771
3,820,118 A * 6/1974 Hall ........................... 343/872
3,858,214 A * 12/1974 Jones, Jr. ..................... 342/362
4,121,002 A * 10/1978 Baldwin ..................... 428/36.4
4,210,804 A * 7/1980 LaTorre et al. ........... 250/203.1
4,240,596 A * 12/1980 Winderman et al. ........ 244/3.16
4,415,130 A * 11/1983 Staehlin ...................... 244/3.15
4,431,996 A * 2/1984 Milligan ...................... 343/708
4,451,833 A * 5/1984 Traut .......................... 343/872
4,520,973 A * 6/1985 Clark et al. ................ 244/3.16
4,600,166 A * 7/1986 Califano et al. ............ 244/3.16
4,693,678 A * 9/1987 Von Volkli ............... 425/405.1
4,930,731 A 6/1990 Roy et al.

(Continued)

FOREIGN PATENT DOCUMENTS

DE 3243823 A1 * 5/1984

(Continued)

OTHER PUBLICATIONS

International Search Report from corresponding International Application No. PCT/US07/02101.

*Primary Examiner*—Michael R Mansen
*Assistant Examiner*—Joshua J Michener
(74) *Attorney, Agent, or Firm*—Renner, Otto, Boisselle & Sklar, LLP

(57) ABSTRACT

A missile includes a radome-seeker airframe assembly that has a single-piece composite material forebody. The forebody is made of a high-temperature composite material that can withstand heat with little or no ablation. The forebody has a front part with an ogive shape and an aft part that has a cylindrical shape. The front part acts as a radome for a seeker located within the forebody. Patch antennas are attached to an inside surface of the cylindrical aft part. The aft part acts as a radome for the patch antennas, allowing signals to be sent and received by the patch antennas without a need for cutouts. A single seal may be used to seal the guidance system and seeker within the forebody, allowing the equipment to be hermetically sealed within the forebody.

22 Claims, 6 Drawing Sheets

U.S. PATENT DOCUMENTS

| | | | | | |
|---|---|---|---|---|---|
| 5,103,734 | A | * | 4/1992 | Arnaud et al. | 102/489 |
| 5,129,990 | A | * | 7/1992 | Binnie et al. | 216/34 |
| 5,314,144 | A | * | 5/1994 | Porter et al. | 244/132 |
| 5,483,894 | A | * | 1/1996 | Facciano et al. | 102/293 |
| 5,707,723 | A | * | 1/1998 | Harrison et al. | 428/313.3 |
| 5,824,404 | A | | 10/1998 | Brown et al. | |
| 5,849,234 | A | * | 12/1998 | Harrison et al. | 264/257 |
| 5,982,339 | A | * | 11/1999 | Lalezari et al. | 343/872 |
| 6,080,455 | A | * | 6/2000 | Purinton et al. | 428/34.5 |
| 6,091,375 | A | * | 7/2000 | Goto et al. | 343/872 |
| 6,098,928 | A | * | 8/2000 | Bross et al. | 244/131 |
| 6,407,711 | B1 | * | 6/2002 | Bonebright et al. | 343/705 |
| 6,460,807 | B1 | * | 10/2002 | Braitinger et al. | 244/133 |
| 6,526,860 | B2 | | 3/2003 | Facciano et al. | |
| 6,531,989 | B1 | | 3/2003 | Barker et al. | |
| 2002/0146192 | A1 | | 10/2002 | Tangonan | |
| 2003/0152819 | A1 | * | 8/2003 | Hatoh et al. | 429/32 |
| 2004/0056818 | A1 | * | 3/2004 | Sledkov | 343/797 |
| 2004/0070536 | A1 | | 4/2004 | Stotler et al. | |

FOREIGN PATENT DOCUMENTS

| | | |
|---|---|---|
| DE | 102004044203 | 3/2006 |

* cited by examiner

COMPOSITE MISSILE NOSE CONE

BACKGROUND OF THE INVENTION

1. Technical Field of the Invention

This invention relates generally missile nose cones, and in particular to nose cones with integrated radar systems and/or antennas.

2. Description of the Related Art

Common present missile airframe technologies rely on a ceramic forward radome, a metallic seeker and guidance section fuselage, and an ablative thermal protection system with cutouts for side-mounted antennas and conformal radomes. FIGS. 1-3 show an example of such a prior art missile forward section 200, including a nose cone 201 having a ceramic frontal ogive radome 202, with a titanium nose tip 204. The radome 202 is made of slip cast fused silica. Aft of the ceramic radome 202 are a glass-reinforced phenolic composite material sleeve 208, a guidance section fuselage assembly 210, and a missile body 212. The antenna guidance section fuselage 210 includes an aluminum fuselage section 214 with a pair of cutouts 216 and 218. External thermal protection system inserts 220 and 222 fit into a recess 224 on the outside of the aluminum fuselage 214. The inserts 220 and 222 have respective cutouts 226 and 228 that overlie the aluminum fuselage cutouts 216 and 218. A pair of antenna radomes 232 and 234 are bonded to aluminum antenna trays 242 and 244, enclosing a pair of patch antennas 236 and 238 in the trays 242 and 244. The antenna radomes 232 and 234 are curved plates, made of a polymer material such as TEFLON, that serve as a thermal protective system, providing protection for the antennas 236 and 238. The antennas 236 and 238 are held in place by antenna trays that are fastened as an assembly to the aluminum fuselage 214. The patch antennas 236 and 238 are positioned at the cutouts 216/226 and 218/228 to send and/or receive signals through the radomes 232 and 234. A guidance section 250 is located within the front of the missile, coupled to a forward mounting ring 252.

The prior art missile has a number of seals: a bonded joint 260 between the ceramic radome 202 and the nose tip 204, a bonded joint 266 between the radome 202 and the phenolic sleeve 208, and polysulfide seals 268, 270, 272, and 274 at various points along the aluminum fuselage 214. Each of these seals represents a potential leak point.

There exists room for improvement in the present state of design of such missile noses.

SUMMARY OF THE INVENTION

According to an aspect of the invention, a missile includes a composite material forebody.

According to another aspect of the invention, a missile includes a composite material forebody that acts as a radome for a seeker within the forebody.

According to yet another aspect of the invention, a missile includes a composite material forebody that has an ogive-shape forward portion and a substantially cylindrical aft portion.

According to still another aspect of the invention, a missile includes a composite material forebody that includes a high temperature resin.

According to a further aspect of the invention, a missile includes a composite material forebody that includes a high temperature resin and glass and/or quartz fibers.

According to a still further aspect of the invention, a composite material forebody has one or more antennas along an inner surface. The antennas may be in contact with the inner surface, and may be attached to the inner surface. The antennas may be patch antennas. The composite material may be made of material which does not interfere with signals being sent or received by the antennas.

According to another aspect of the invention, a missile nose section includes a composite material forebody, and equipment hermetically sealed within the forebody. A ceramic layer on the outside or inside of the composite material forebody may aid in sealing the nose section by preventing ingress of gasses and/or moisture through the composite material forebody.

According to yet another aspect of the invention, a missile nose section includes: a single-piece composite material forebody; and equipment at least partially within the forebody. The forebody includes an ogive-shape forward part and a substantially cylindrical aft part.

According to still another aspect of the invention, a missile nose section includes: a single-piece composite material forebody; and one or more antennas positioned along an inner surface of the forebody.

According to a further aspect of the invention, a missile nose section includes: a composite material forebody; and equipment within the forebody. The equipment is hermetically sealed within the forebody.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale.

DETAILED DESCRIPTION

A missile includes a radome-seeker airframe assembly that has a single-piece composite material forebody that is coupled to a missile body of the missile. The forebody is made of a high-temperature composite material that can withstand heat with little or no ablation. The forebody has a front part with an ogive shape and an aft part that has a cylindrical shape. The front part acts as a radome for a seeker located within the forebody. Patch antennas are attached to an inside surface of the cylindrical aft part. The aft part acts as a radome for the patch antennas, allowing signals to be sent and received by the patch antennas without a need for cutouts. A single seal may be used to seal the guidance system and seeker within the forebody, allowing the guidance system and seeker to be hermetically sealed within the forebody. Compared with prior art systems, the forebody reduces the number of parts, manufacturing complexity, weight, and cost. Structural robustness is improved by stiffening the structure, and avoiding the need to mechanically bond or attach multiple pieces. Sealing characteristics are improved, with the ability to hermitically seal the forebody. Reduction of ablation of material can also increase reliability of the missile, by reducing the possible pre-ignition of the warhead, located aft of the radome-seeker airframe assembly.

Figure 4:
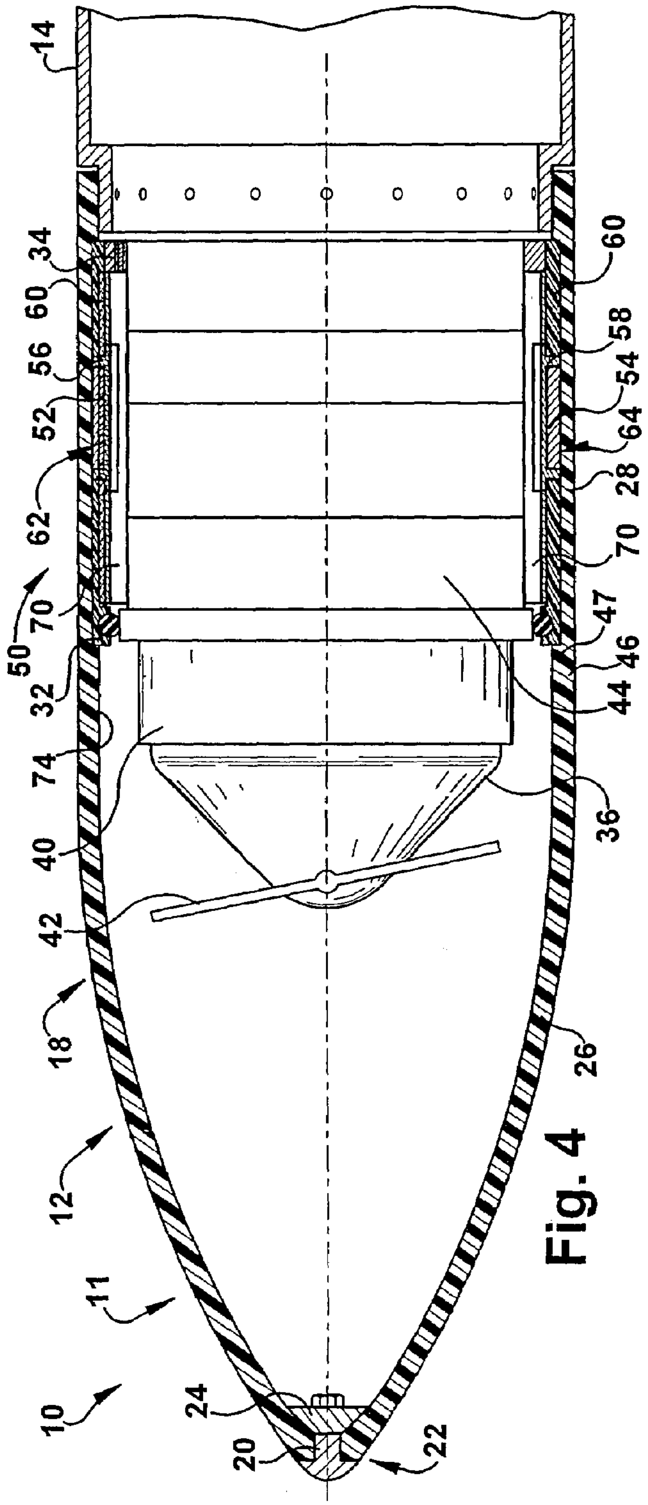
FIG. 4 is a side sectional view of a missile nose section in accordance with the present invention.

FIG. 4 shows a missile 10 having a nose section 11 that includes a radome-seeker forward airframe assembly 12 that is mechanically coupled to a missile body 14. The forward airframe assembly has a forebody 18 having a nose tip 20. The nose tip 20 may be made of a suitable metal, such as titanium or corrosion resistant steel (CRES). Alternatively, the nose tip 20 may be made of a suitable ceramic. The nose tip 20 is attached to a tip opening 22 in the forebody 18 by connection to it of a fixture 24 on the inside of the forebody 18. The fixture 24 is larger than the tip opening 22. The coupling of the fixture 24 to the nose tip 20 secures the nose tip 20 in place within the tip opening 22. The nose tip 20 provides a strong and thermally resistant component of the forward airframe assembly 12 at the very tip of the missile 10, wherein the stagnation point of flow around the missile is located.

The forebody 18 has an ogive shape forward part 26 and a cylindrical aft part 28. The forward part 26 increases in diameter with distance back from the tip opening 22. The shape of the forward part 26 is streamlined so as to reduce drag of the missile 10.

The aft part 28 is cylindrical in shape, with a forward mounting ring 32 and an aft mounting ring 34 along an inner surface of the aft part 28. The mounting rings 32 and 34 are used for mounting equipment 36 inside the forebody 18. The equipment 36 may include radar or other data-gathering equipment, navigation equipment, and/or communication equipment. In the illustrated embodiment, the equipment 36 includes a seeker 40 with a planar array 42, and a guidance system 44. As shown in FIG. 4, most of the volume of the equipment 36 is between the mounting rings 32 and 34, forward of the aft mounting ring 34 and aft of the forward mounting ring 32. Furthermore, as also seen in FIG. 4, substantially all of the seeker 40 is between the mounting rings 32 and 34, forward of the aft mounting ring 34 and aft of the forward mounting ring 32.

The forebody 18 is made from a single piece of composite material. The composite material body tapers smoothlessly and seamlessly from the ogive shape forward part 26 to the cylindrical aft part 28. The composite material may be a glass or quartz reinforced laminate that functions as both a non-ablative thermal protection system for all of the equipment 36, as well as a frontal and conformal radiatively-transparent radome for the seeker 40. The resin for the composite material may be a suitable thermoset resin, for example one or more of bismaleimide (BMI), cyanate esters (CE), polyimide (PI), phthalonitrile (PN), and polyhedral oligomeric silsesquioxanes (POSS). As other alternatives, the resin may be a suitable thermoplastic, or a non-organic silicone-based material, such as polysiloxane. In addition, graphite fibers are used to provide structural reinforcement to parts of the forebody 18, as is described in greater detail below.

In making the forebody 18, fibers in thread form may be used. The fibers are wound about a form or mandrel having the desired shape of the forebody 18. Resin is then spread in and around the wound threads, and the structure is heated to cure the resin. The forebody 18 may be built up in multiple layers, each of the layers being separately formed by winding fiber thread, introducing resin, and curing the resin. For instance, different steps may be used for building up parts of the composite material that do and do not contain graphite fibers. Alternatively, the forebody 18 may be built in a single step, with even fibers of different types being cured in a single curing process. The mounting rings 32 and 34 may be formed and cured as integral parts of the forebody 18, in the same steps as the rest of the forebody 18 is formed. Alternatively, the mounting rings 32 and 34 may be pre-formed, before the rest of the forebody 18, and may be secured as parts of the forebody 18 as the rest of the forebody is built up.

Other methods of forming composite material articles include use of resin transfer molding, tape placement, and compression molding. It will be appreciated that details are well known for processes used for fabricating composite material articles. Further details regarding methods for fabricating composite material articles may be found In U.S. Pat. Nos. 5,483,894, 5,824,404, and 6,526,860, the descriptions and figures of which are herein incorporated by reference.

As noted above, the forebody 18 may be integrally manufactured with variations in thickness and/or material composition, for example being thicker or having different or additional fibers, such as graphite fibers, in portions that will be exposed to the greatest stress. To give one example, different fiber compositions and/or configurations may be used in the forward part 26, and in various portions of the aft part 28. Glass and/or quartz fibers may be used in an outer portion 46 of the forebody aft part 28. Graphite fibers may be used in a structurally-stronger inner portion 47 of the forebody aft part 28. (In the illustrations, the portions 46 and 47 are shown as parts of a single material system.)

The forebody 18 is made of a composite material that uses a high-temperature composite resin, which provides for advantageous thermal performance over prior art systems that include composite materials with phenolic resins. Composite materials with phenolic resins may char and generate external glassy carbon layers when exposed to heat. These carbon layers are conductive to RF signals, and their generation can thus interfere with operations of antennas of the missile. In addition, prior art phenolic composite materials can flake off when heated, generating hot debris that can result in a false signal indication in premature warhead ignition. These problems may be reduced or avoided by the high-temperature composite materials of the forebody 18, which maintain their integrity much better when exposed to heat.

A ceramic material layer 48 may be provided on an outside surface of the forebody 18. The ceramic material layer 48 prevents movement of moisture and/or gasses through the forebody 18. This aids in sealing the volume within the forebody 18. The ceramic material layer 48 may be made of a suitable ceramic material, deposited on the outer surface of the forebody 18 to a thickness of 1-3 mils. The ceramic material layer 48 may be deposited by a suitable method, such as chemical vapor deposition or spraying. As an alternative, the ceramic material layer 48 may alternatively be located on an inside surface of the forebody 18.

Figure 5:
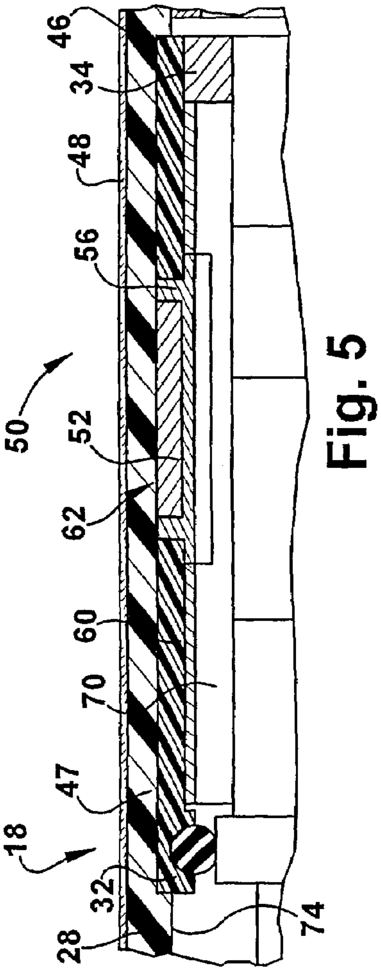
FIG. 5 is an enlarged view of a portion of the view of FIG. 4, showing details of the antenna assembly.
Figure 6:
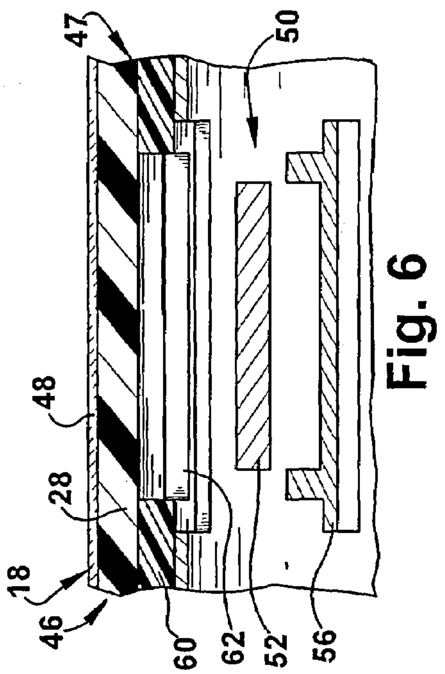
FIG. 6 is an exploded view of the portion of FIG. 5.

Referring now in addition to FIGS. 5 and 6, a guidance section fuselage assembly 50 is coupled to an inside surface of the aft part 28 of the forebody 18, between the mounting rings 32 and 34. The guidance section fuselage assembly 50 includes a pair of duroid laminate patch antennas 52 and 54. The antennas 52 and 54 are bonded to antenna trays 56 and 58, which in turn are bonded to a graphite structure 60. The graphite structure 60 is the graphite-fiber-containing composite inner portion 47 of the forebody aft part 28. The graphite structure 60 has openings 62 and 64 for receiving the antenna trays 56 and 58. An electrically-conductive inner layer 70 is located along an inner surface of the graphite structure 60. The electrically-conductive layer 70 may be a suitable layer of titanium or corrosion resistant steel foil.

The graphite structure 60 may be integrally formed along with the rest of the forebody 18. The term "graphite structure," as used herein, refers to a composite material portion with graphite fibers and resin. The graphite fibers provide additional structural strength to the graphite structure 60, compared to other parts of the composite material forebody 18, which has only quartz fibers and/or glass fibers. The graphite structure 60 may have a thickness of about 50% of the overall thickness of the forebody 18. The thickness of the graphite structure 60 may be about 38 mm (0.15 inches).

The antenna trays 56 and 58 may be made out of aluminum, and may be inserted into the structure openings 62 and 64 such that the antennas 52 and 54 are against an inner surface 74 of the forebody 18. The aluminum of the antenna trays 56 and 58 may have a nickel coating to prevent galvanic corrosion where it contacts the electrically-conductive layer 70.

As noted above, the conductive inner layer 70 may be a metal layer, such as a titanium layer, a layer of corrosion resistant steel, or a layer of molybdenum. The metal layer may have a thickness from 0.0254 to 0.254 mm (0.001 to 0.010 inches). Alternatively, the conductive inner layer 70 may be a flame spray layer or a sputtered layer applied to an inner surface of the graphite structure 60. The conductive inner layer 70 provides protection against electro-magnetic interference (EMI) that might otherwise interfere with proper functioning of the equipment 36. In addition, the conductive inner layer 70 may provide a ground plane for the antennas 52 and 54.

Figure 1:
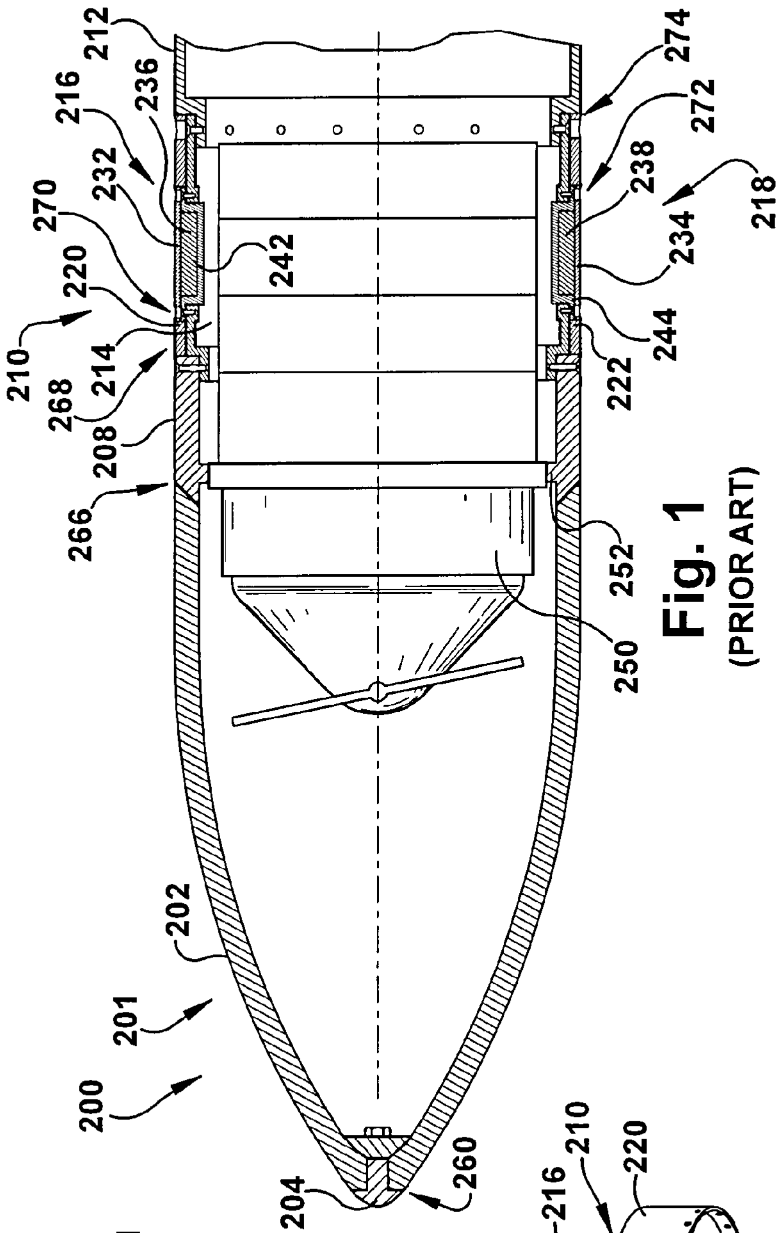
Fig. 1 (PRIOR ART)
FIG. 1 is a side sectional view of a forward portion of a prior art missile.
Figure 2:
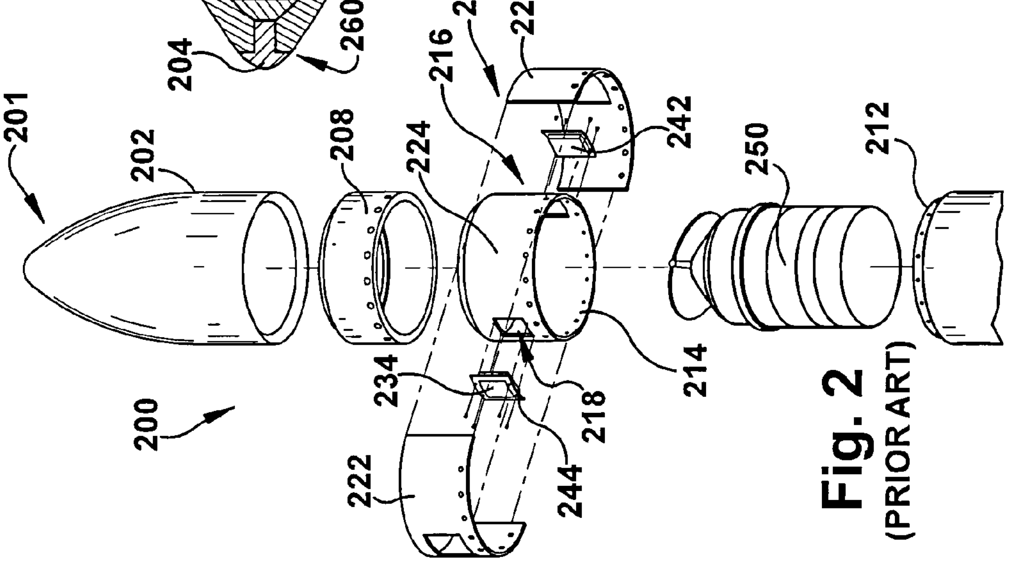
Fig. 2 (PRIOR ART)
FIG. 2 is an exploded view of the prior art missile forward portion of FIG. 1.
Figure 3:
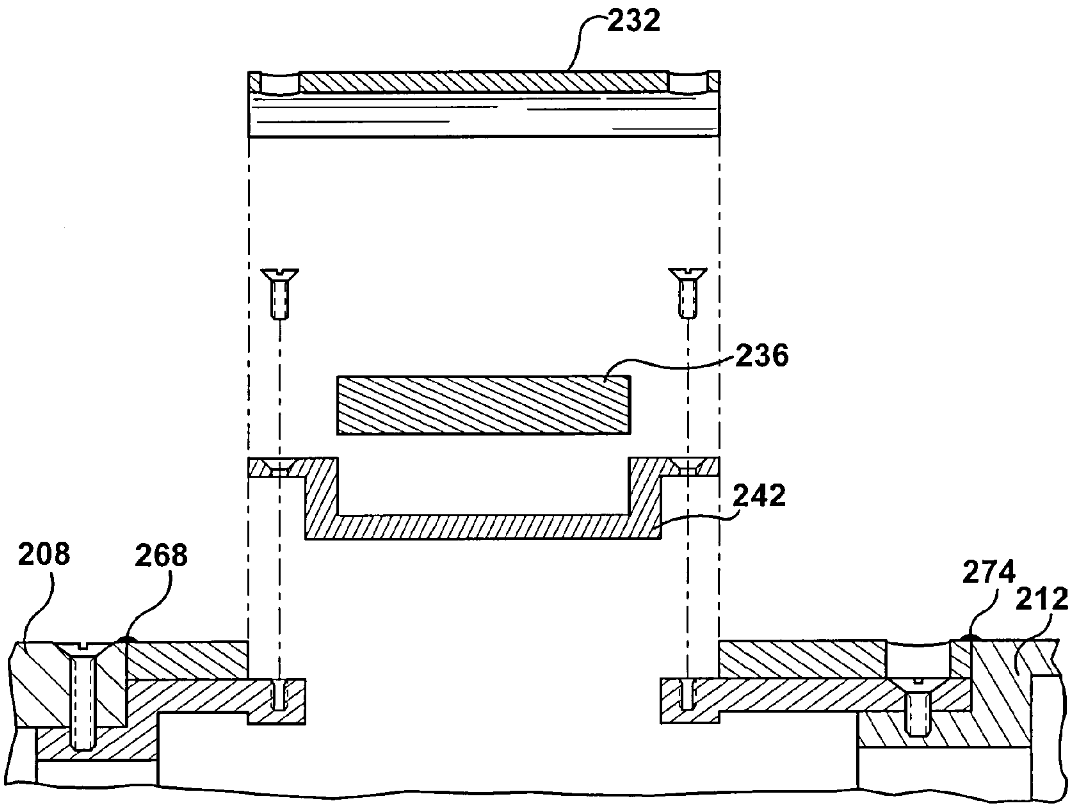
Fig. 3 (PRIOR ART)
FIG. 3 is a partially exploded view showing details of the attachment of the patch antennas of the missile forward portion of FIG. 1.

The mounting of the antennas 52 and 54 avoids the need for any sort of cutouts in the external structure of the missile 10. The composite material of the forebody 18 that is external to the graphite structure 60 does not interfere with RF signals sent or received by the antennas 52 and 54. By avoiding the need for cutouts, such as the cutouts 216 and 218 in the prior art missile forward body 200 (FIG. 1), structural integrity is improved. The resins used in the composite material forebody 18 may advantageously reduce or eliminate fly-away debris, such as ablative materials and broken pieces of sealant material, that may occur with prior art structures. In addition, the configuration of FIGS. 4 and 5 avoids possible failure of adhesives or other means to attach covers over cutouts. Further, the possibility of leakage through cutouts is avoided.

The antennas 52 and 54 may be communication link antennas, for providing communication with ground stations or other locations external to the missile 10. Other possible functions for the antennas 52 and 54 include telemetry, flight termination systems, global positioning systems, and target video systems. Although the embodiment has been described above as involving two such antennas, it will be appreciated that a greater or lesser number of antennas may utilized, and that multiple antennas may have different configurations and/or functions.

Figure 7:
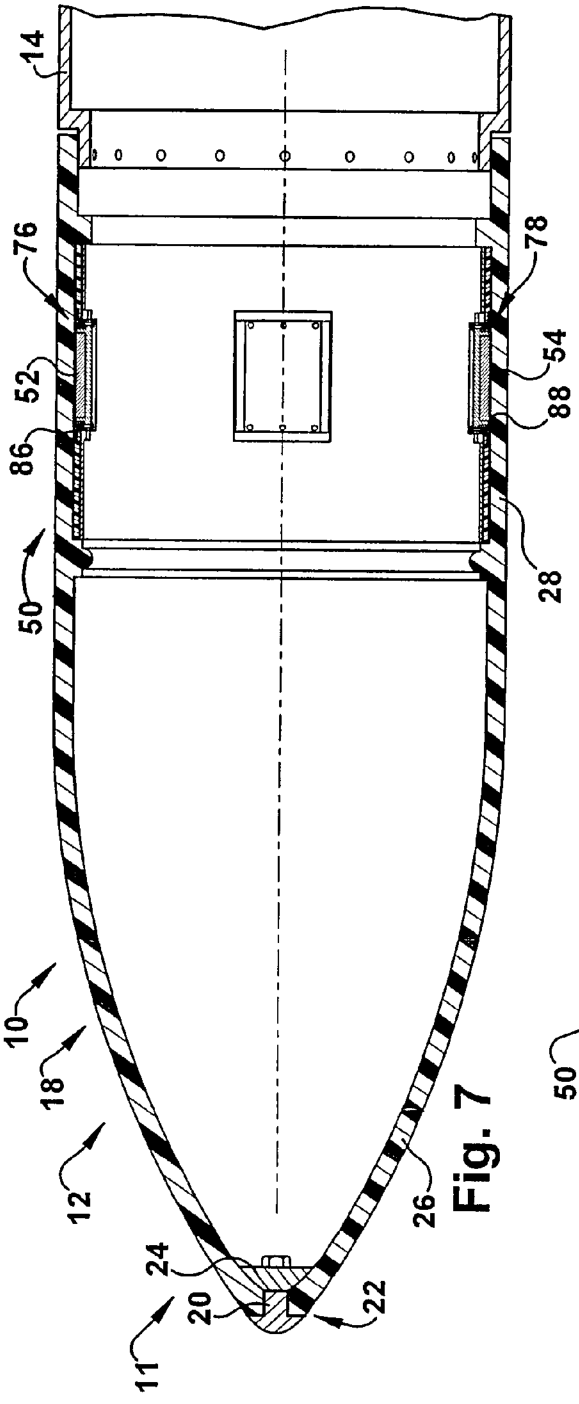
FIG. 7 is a side sectional view of a missile nose section with an alternate configuration antenna assembly.
Figure 8:
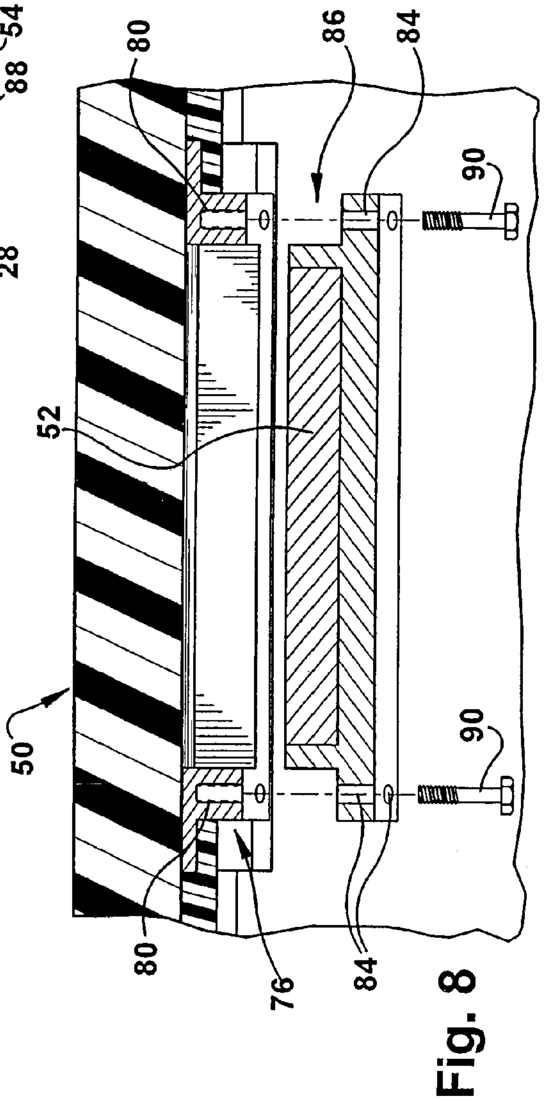
FIG. 8 is an exploded view of a portion of the view of FIG. 7, showing details of the alternate configuration antenna assembly.

FIGS. 7 and 8 illustrate an alternate configuration for mounting the antennas 52 and 54, in an alternate embodiment of the guidance section fuselage assembly 50. Inserts 76 and 78 are integrally formed with the graphite structure 60 and the forebody 18. The inserts 76 and 78 may be made of a suitable metal, such as titanium or corrosion resistant steel. The inserts 76 and 78 have threaded holes 80 configured to align with corresponding holes 84 in antenna trays 86 and 88. The antenna trays 86 and 88 may be made of the same material as the inserts 76 and 78, such as being made of titanium or corrosion resistant steel. The antennas 52 and 54 are bonded to the antenna trays 86 and 88 in a manner similar to the bonding to the antenna trays 56 and 58 (FIG. 5). Threaded fasteners 90 are used to couple the antenna trays 86 and 88 to the inserts 76 and 78, with the antennas 52 and 54 against the inner surface 74 of the forebody 18. The conductive inner layer 70 on an inside surface of the graphite structure 60 provides a ground plane and protection against EMI.

The antenna mounting configuration shown in FIGS. 7 and 8 has the advantage of allowing access to the antennas 52 and 54 after installation, for example for possible replacement or reworking of the antennas 52 and 54. The configuration shown in FIGS. 4-6, while being essentially a permanent bonding, advantageously uses fewer parts, and may weigh less.

Figure 9:
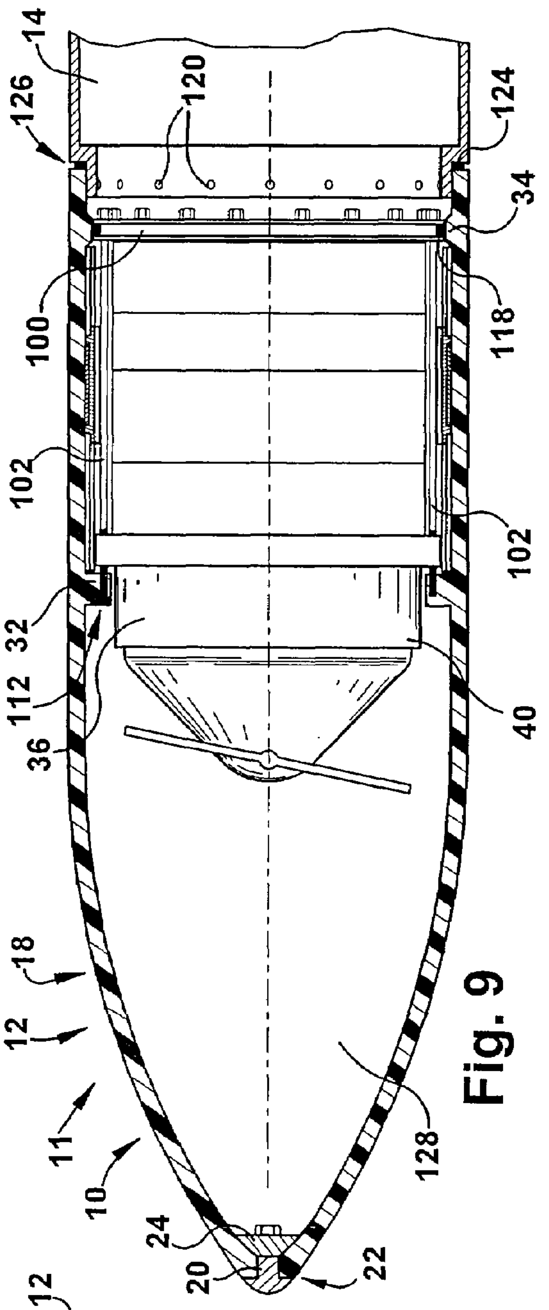
FIG. 9 is a side sectional view showing a first configuration of packaging of a missile nose section in accordance with the present invention.
Figure 11:
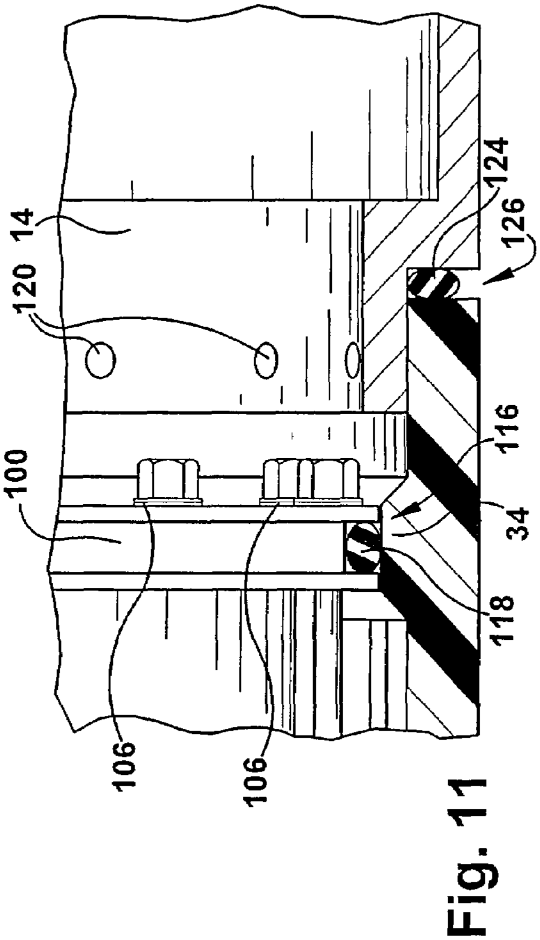
FIG. 11 is an enlarged view of a portion of FIG. 9, showing details of sealing of the first packaging configuration.
Figure 10:
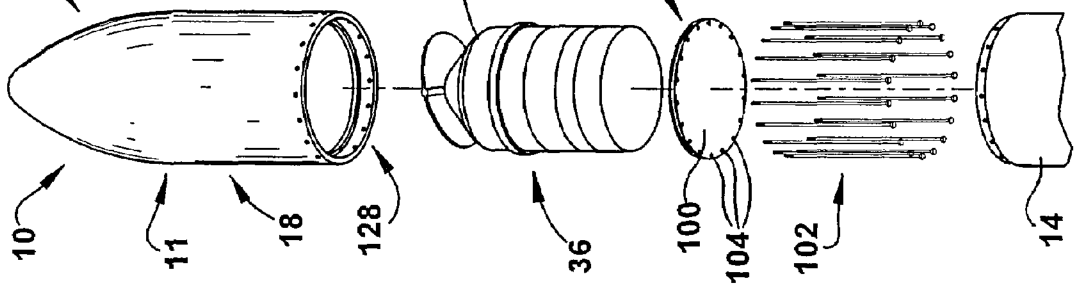
FIG. 10 is an exploded view of the first packaging configuration of FIG. 9.

FIGS. 9-11 illustrate one configuration for coupling together and sealing the nose section 11, with the equipment 36 within the forward airframe 12. The equipment 36 is loaded in the forebody 18, with an aft mounting plate 100 behind the equipment 36. Threaded bolts 102 are inserted through corresponding holes 104 in the aft mounting plate 100, and are sealed there by gaskets. The bolts 102 are threadedly engaged with internally threaded portions 112 of the forward mounting ring 32. The threaded portions 112 of the forward mounting ring 32 may be threaded inserts within the forward mounting ring 32, for example being internally threaded steel inserts held in place by composite material formed around them. Alternatively, the threaded portions 112 may be internally threaded holes within the composite material itself.

The mounting plate 100 includes a circumferential groove 116 that retains an O-ring 118 that is in contact with the aft mounting ring 34 when the equipment 36 and the mounting plate 100 are installed within the forebody 18. The O-ring 118 provides vibration damping between the forebody 18 and the equipment 36. The O-ring 118 may also provide hermetic sealing along the gap between the forebody 18 and the equipment 36.

The equipment 36 is supported within the forebody 18 at both of the mounting rings 32 and 34. This provides a tight and rigid mounting for the equipment 36, and specifically for the seeker 40.

The forebody 18 is coupled to the aft missile body 14 by a series of circumferentially-spaced fasteners 120, as is well known. An O-ring 124 is used to provide a seal at a joint 126 between forebody 18 and the aft missile body 14. The seal at the joint 126 may be a hermetic seal, preventing ingress of moisture and other contaminants into the interior volume 128 of the forebody 18.

Figure 12:
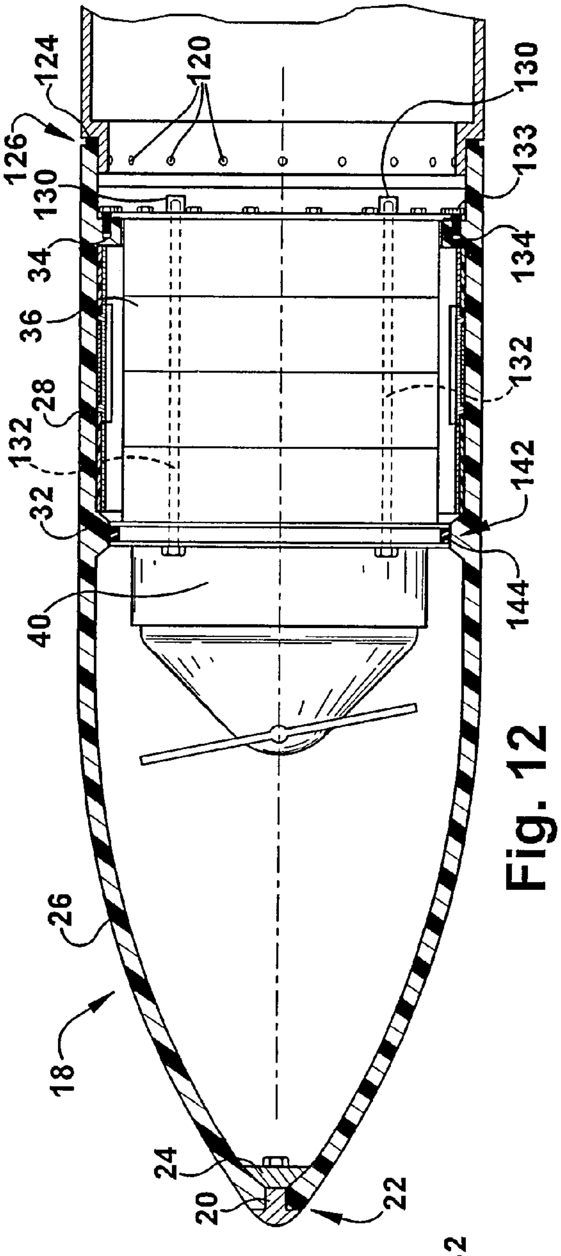
FIG. 12 is a side sectional view showing a second configuration of packaging of a missile nose section in accordance with the present invention.
Figure 14:
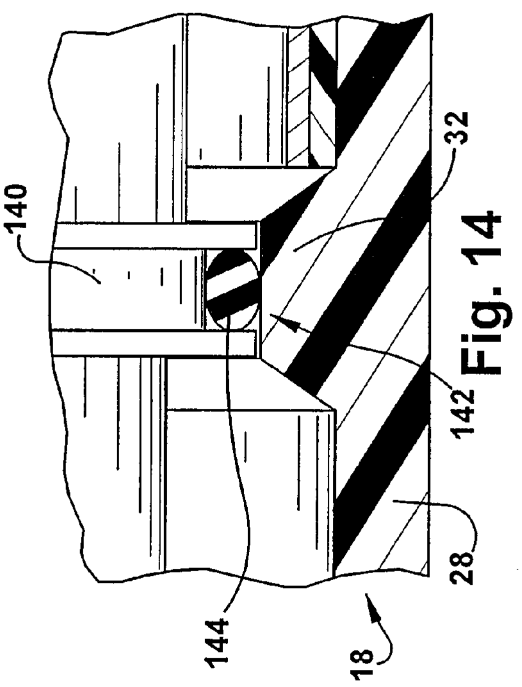
FIG. 14 is an enlarged view of a portion of FIG. 12, showing details of a vibration damping feature of the second packaging configuration.
Figure 13:
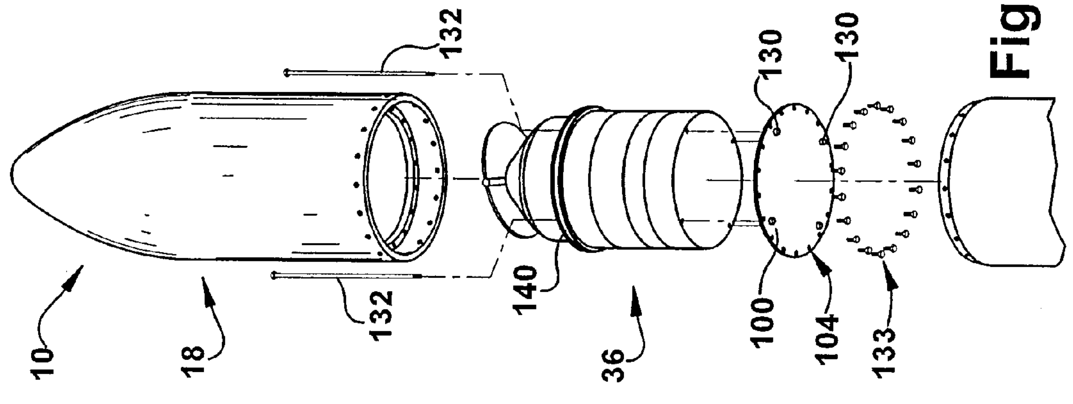
FIG. 13 is an exploded view of the second packaging configuration of FIG. 12.

FIGS. 12-14 illustrate one configuration for coupling together and sealing the nose section 11. Long threaded bolts 132 are threaded into internally threaded protrusions 130 in the aft mounting plate 100. Shorter threaded bolts 133 pass through the holes 104 in the aft mounting plate 100, and engage holes 134 of the aft mounting ring 34. As with the internally threaded portions 112 (FIG. 9) discussed above, the internally threaded portions 134 may be threaded inserts or may be threaded holes in the composite material. The threaded bolts 133 may be sealed at the holes 104 by one or more suitable gaskets. An O-ring or other suitable seal may be provide between the aft mounting plate 100 and the aft mounting ring 34.

The equipment 36 has an annular protrusion 140 that has a circumferential groove 142 with an O-ring 144 therein. The O-ring 144 presses against the forward mounting ring 32, and provides vibration damping between the equipment 36 and the forebody 18, while allowing the forward mounting ring 32 to provide support for mounting the equipment 36.

The coupling between the forebody 18 and the aft missile body 14 may be identical to that described above, with coupling provided by the circumferentially-spaced fasteners 120, and with the O-ring 124 providing a seal at the joint 126 between the forebody 18 and the aft missile body 14. As an alternative, the O-ring 118 may provide sealing around the aft mounting plate 100.

The missile nose section 11 described herein provides many advantages over prior art nose sections, including decreased weight, cost, part count, and seal joints, and increased structural integrity, reliability, and performance. Fabrication is simplified and speeded up.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A missile nose section comprising:

a single-piece monolithic composite material forebody;

equipment at least partially within the forebody;

one or more antennas;

one or more antenna trays that receive respective of the one or more antennas;

wherein the forebody includes an ogive-shape forward part and a substantially cylindrical aft part;

wherein the one or more antennas are positioned along an inner surface of the aft substantially cylindrical part of the forebody, substantially parallel to the inner surface of the substantially cylindrical aft part;

wherein the one or more antenna trays are held in place relative to the forebody without cutouts or holes in the forebody; and wherein the one or more antennas are between a forward mounting ring and an aft mounting ring that protrude radially inward along the inner surface of the aft part.

2. The missile nose section of claim 1, wherein the one or more antennas are bonded to the respective antenna trays.

3. The missile nose section of claim 1, wherein the one or more antennas are in contact with the inner surface of the forebody.

4. The missile nose section of claim 1, wherein the one or more antennas are patch antennas.

5. The missile nose section of claim 1, further comprising a metal or ceramic nose tip attached to a tip opening of the forward part.

6. The missile nose section of claim 1, wherein composite material of the forebody includes a thermoset resin.

7. The missile nose section of claim 6, wherein the thermoset resin includes one or more of bismaleimide (BMI), cyanate esters (CE), polyimide (PI), phthalonitrile (PN), and polyhedral oligomeric silsesquioxanes (POSS).

8. The missile nose section of claim 6, wherein the composite material further includes:

one or more of glass fibers and quartz fibers in both the ogive-shape forward part and an outer portion of the cylindrical aft part; and graphite fibers in an inner portion of the cylindrical aft part.

9. The missile nose section of claim 1, wherein the equipment is hermetically sealed within the forebody.

10. The missile nose section of claim 1, wherein the equipment includes a seeker.

11. The missile nose section of claim 1, wherein the equipment includes a guidance system.

12. A missile nose section comprising:

a single-piece monolithic composite material forebody;

equipment at least partially within the forebody; and one or more antennas;

wherein the forebody includes an ogive-shape forward part and a substantially cylindrical aft part;

wherein the one or more antennas are positioned along an inner surface of the aft substantially cylindrical part of the forebody, substantially parallel to the inner surface of the substantially cylindrical aft part;

wherein the forebody includes a forward mounting ring and an aft mounting ring as parts of the single-piece composite material forebody; and wherein both of the mounting rings protrude radially inward along the inner surface of the aft part.

13. The missile nose section of claim 12, wherein the mounting rings structurally support the equipment.

14. The missile nose section of claim 13, further comprising a mounting plate aft of the equipment;

wherein the mounting plate is coupled by threaded fasteners to threaded portions of one of the mounting rings.

15. The missile nose section of claim 14, wherein the one of the mounting rings is the forward mounting ring;

wherein the threaded fasteners pass through holes in the mounting plate; and further comprising an O-ring in a circumferential groove in the mounting plate, wherein the O-ring is contact with the aft mounting ring.

16. The missile nose section of claim 12, further comprising a mounting plate aft of the equipment;

wherein the mounting plate is coupled by threaded fasteners to threaded portions of one of the mounting rings.

17. The missile nose section of claim 16, further comprising an O-ring seal between the other of the mounting rings and one of either the mounting plate or a portion of the equipment.

18. The missile nose section of claim 12, wherein most of the volume of the equipment is between the mounting rings, forward of the aft mounting ring and aft of the forward mounting ring.

19. The missile nose section of claim 12, wherein the equipment includes a seeker; and wherein substantially all of the seeker is between the mounting rings, forward of the aft mounting ring and aft of the forward mounting ring.

20. A missile nose section comprising:

a single-piece monolithic composite material forebody;

equipment at least partially within the forebody; and one or more antennas;

wherein the forebody includes an ogive-shape forward part and a substantially cylindrical aft part;

wherein the one or more antennas are positioned along an inner surface of the aft substantially cylindrical part of the forebody, substantially parallel to the inner surface of the substantially cylindrical aft part;

wherein the one or more antennas are between a forward mounting ring and an aft mounting ring that protrude radially inward along the inner surface of the aft part;

wherein the one or more antennas are mounted in respective one or more openings in a graphite structure along the aft part inner surface; and wherein the graphite structure is radially inward of the aft part inner surface.

21. The missile nose section of claim 20, further comprising:

one or more metal inserts in respective of the one or more openings in the graphite structure; and one or more antenna trays that hold the one or more antennas, and are coupled to respective of the one or more metal inserts.

22. The missile nose section of claim 21, wherein the one or more metal inserts have threaded holes therein; and wherein the one or more antenna trays are coupled to the one or more metal inserts by threaded fasteners that pass through holes in the antenna trays and engage the threaded holes in the metal inserts.

* * * * *